US011133518B2

(12) United States Patent
Verhoeven et al.

(10) Patent No.: US 11,133,518 B2
(45) Date of Patent: Sep. 28, 2021

(54) ORGANIC MATTER POWERED DEVICE

(71) Applicant: NXP B.V., Eindhoven (NL)

(72) Inventors: Henri Verhoeven, Someren (NL); Oswald Moonen, Eindhoven (NL); Stephen Owen, Nuenen (NL)

(73) Assignee: NXP B.V., Eindhoven (NL)

( * ) Notice: Subject to any disclaimer, the term of this patent is extended or adjusted under 35 U.S.C. 154(b) by 282 days.

(21) Appl. No.: 16/248,250

(22) Filed: Jan. 15, 2019

(65) Prior Publication Data

US 2020/0227767 A1 Jul. 16, 2020

(51) Int. Cl.
*H01M 8/16* (2006.01)
*H01M 4/90* (2006.01)
*H01M 4/86* (2006.01)

(52) U.S. Cl.
CPC .......... *H01M 8/16* (2013.01); *H01M 4/9008* (2013.01); *H01M 4/8657* (2013.01)

(58) Field of Classification Search
USPC .......................................................... 429/2
See application file for complete search history.

(56) References Cited

U.S. PATENT DOCUMENTS

2004/0199343 A1* 10/2004 Cardinal .............. G01R 31/364
702/63
2010/0266906 A1* 10/2010 Otadi ...................... H01M 8/16
429/401
2011/0195280 A1* 8/2011 Huang .................... H01M 8/16
429/2
2012/0187897 A1 7/2012 Lenk et al.
2017/0339839 A1* 11/2017 Carstensen ............ A01G 7/045
2019/0260053 A1* 8/2019 Simons ............... H01M 8/1016

FOREIGN PATENT DOCUMENTS

CN 102280648 A 12/2011

OTHER PUBLICATIONS

Nealon, Sean; "Making Batteries with Portabella Mushrooms"; UCR Today, University of California, Riverside; retrieved from the internet Apr. 5, 2019 https://ucrtoday.ucr.edu/31442; 2 pages (Sep. 29, 2015).
Das, Debabrata (Ed.); "Microbial Fuel Cell—A Bioelectrochemical System that Converts Waste to Watts"; Abstract and Table of Contents; Springer; 5 pages (2018).

(Continued)

*Primary Examiner* — Christopher P Domone

(57) ABSTRACT

One example discloses an organic matter powered device, comprising: a set of electrodes configured to be coupled to a set of biologically active organic matter; a power generation circuit coupled to the electrodes; wherein the power generation circuit is configured to receive a first voltage and current from the organic matter, and output a second voltage and current generated by the first voltage and current; a monitoring circuit coupled to the electrodes and coupled to monitor the first voltage and current, and to be powered by the second voltage and current; wherein the monitoring circuit is configured to translate variations in the first voltage and current into an environmental attribute.

22 Claims, 5 Drawing Sheets

(56) References Cited

OTHER PUBLICATIONS

Helder, Marjolein; "Design Criteria for the Plant-Microbial Fuel Cell—Electricity Generation with Living Plants—From Lab to Application"; Thesis, Wageningen University; retrieved from the Internet http://edepot.wur.nl/239054 161 pages (Nov. 23, 2012).

Maxim Integrated; "MAX17220-MAX17225—400mV to 5.5V Input, nanoPower Synchronous Boost Converter with True Shutdown Data Sheet—Rev 3"; retrieved from the Internet https://datasheets.maximintegrated.com/en/ds/MAX17220-MAX17225.pdf; 23 pages (Jul. 2017).

Plant-E; "About Plant-E"; retrieved from the Internet https://ww.plant-e.com/eng; 4 pages (Jan. 14, 2019).

Texas Instruments; "TPS6120x Low Input Voltage Synchronous Boost Converter with 1.3-A Switches"; Data Sheet; retrieved from the Internet http://www.ti.com/product/TPS61200; 35 pages (Mar. 2007, revised Dec. 2014).

University of Sao Paulo, College of Agriculture; "Plant-e: Plants Generating Electricity"; retrieved from the Internet Jan. 14, 2018 http://www.esalq.usp.br/lepse/imgs/conteudo_thumb/Plant-e-Plants-Generating-Electricity.pdf; 6 pages.

Wetser, Koen; Electricity From Wetlands—Technology Assessment of the Tubular Plant Microbial Fuel Cell with an Integrated Biocathode; Thesis, Wageningen University; retrieved from the Internet http://edepot.wur.nl/397597; 156 pages (Apr. 22, 2016).

Wikipedia; "Energy Harvesting"; retrieved from the Internet https://en.wikipedia.org/wiki/Energy_harvesting; 16 page (Jan. 14, 2019).

Piyare, Rajeev et al; "Plug into a Plant: Using a Plant Microbial Fuel Cell and a Wake-Up Radio for an Energy Neutral Sensing System"; IEEE Conference on Local Computer Networks Workshops; IEEE Computer Society; 8 pages (Nov. 2017).

* cited by examiner

ORGANIC MATTER POWERED DEVICE

The present specification relates to systems, methods, apparatuses, devices, articles of manufacture and instructions powered by biologically active organic matter.

SUMMARY

According to an example embodiment, an organic matter powered device, comprising: a set of electrodes configured to be coupled to a set of biologically active organic matter; a power generation circuit coupled to the electrodes; wherein the power generation circuit is configured to receive a first voltage and current from the organic matter, and output a second voltage and current generated by the first voltage and current; a monitoring circuit coupled to the electrodes and coupled to monitor the first voltage and current, and to be powered by the second voltage and current; wherein the monitoring circuit is configured to translate variations in the first voltage and current into an environmental attribute.

In another example embodiment, the monitoring circuit is not powered by the first voltage and current; and the monitoring circuit is does not monitor the second voltage and current.

In another example embodiment, the environmental attribute is an attribute of the organic matter itself.

In another example embodiment, the environmental attribute includes at least one of the organic matter's: equivalent sugar production, bacterial damage, PH level, fructose level, photosynthesis, oxygen production, structural firmness, decay, insect damage, and chemistry.

In another example embodiment, the organic matter is coupled to a surrounding environment; and the environmental attribute is an attribute of the surrounding environment.

In another example embodiment, the surrounding environment includes at least one of: an agricultural field, a rice patty, a grain field, a legume field, a forest, an orchard, a vineyard, an aquatic environment, or an interior office environment.

In another example embodiment, the surrounding environment attribute is at least one of: temperature, PH level, humidity, radiation level, smog level, carbon dioxide level, ambient light level, length of daylight time, or light color.

In another example embodiment, the organic matter includes at least one of: bacteria, algae, fungi, fruit, an apple, a grape, rice, dirt, tree, plant, agricultural product, corn, spinach, or an indoor plant.

In another example embodiment, the organic matter is a single piece of fruit.

In another example embodiment, the organic matter is soil proximate to a living plant.

In another example embodiment, the power generation circuit includes a voltage boost circuit configured to transform the first voltage and current into the second voltage and current.

In another example embodiment, a maximum value of the second voltage and current is greater than a maximum value of the first voltage and current.

In another example embodiment, the set of electrodes are configured as a pin grid.

In another example embodiment, the pin grid includes a center electrode surrounded by a plurality of galvanically coupled electrodes.

In another example embodiment, further comprising an output device configured to generate a communications signal; wherein the output device is coupled to receive the environmental attribute from the monitoring circuit and modulate the environmental attribute on to the communications signal.

In another example embodiment, further comprising an output device configured as a radiation source; wherein the output device is coupled to receive power from the power generation circuit.

In another example embodiment, the radiation source includes at least one of: an LED (Light Emitting Diode) or an acoustic generation device.

In another example embodiment, the set of electrodes are configured to be coupled to a first set of biologically active organic matter; the radiation source is configured to promote health or growth of a second set of biologically active organic matter; and the second set of biologically active organic matter is not coupled to the set of electrodes.

In another example embodiment, the radiation source is an ultra-violet (UV) radiation source.

In another example embodiment, the radiation source is an infra-red (IR) radiation source.

In another example embodiment, the first set of biologically active organic matter does not depend upon sunlight for growth and/or health, and the second set of biologically active organic matter does depend upon sunlight for growth and/or health.

In another example embodiment, the first set of biologically active organic matter is a chicory.

In another example embodiment, the first set of biologically active organic matter is a mushroom.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
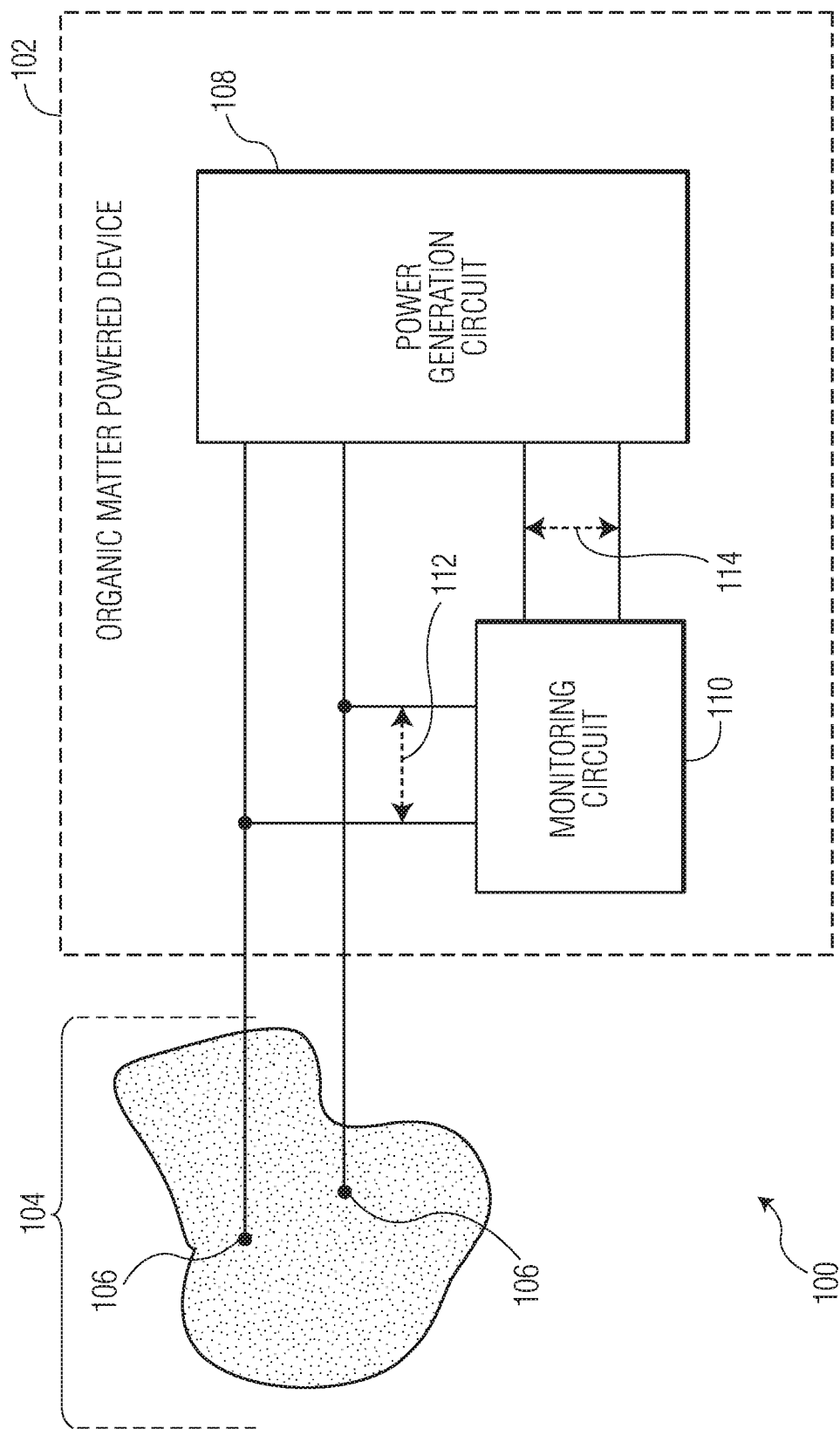
FIG. 1 is a first example of an organic matter powered device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Energy harvesting is an area focused on deriving energy from a resource. While such resources can include existing oil, coal, etc. the phrase has come to be more related to Clean and Renewable Energy.

Plants such as fruit, for example, can generate small amounts of voltage and current; however, such voltage and currents are so small that they are a challenge for harvesting energy from. In an experiment to light an LED (Light Emitting Diode) four lemons may need to be electrically interconnected to power just one LED. Such wiring between plants presents a prohibitive cost on harvesting from such sources. Even between relatively low power LEDs voltage and current requirements can vary (e.g. red LEDs may require only 1.6-1.7V, while white LEDs require between 2.6 and 3.2V).

Now discussed are example embodiments of a biologically active organic matter powered circuit that not only can harvest energy from such organic matter, but provided environmental monitoring and feedback functions as well.

Herein defined, "biologically active" organic matter includes organic matter that has one or more of the following attributes: self-sustaining, self-organized, reproduces, adapts to its environment, responds to stimuli, has a metabolism, or is in homeostasis. Examples of such "biologically active" organic matter includes: plants, fungi, protists, archaea, and bacteria, or entities that include either RNA or DNA molecules.

FIG. 1 is a first example 100 of an organic matter powered device 102. The example 100 shows the organic matter powered device 102 and a set of biologically active organic matter 104. The organic matter powered device 102 includes a set of electrodes 106, a power generation circuit 108, and a monitoring circuit 110. A first voltage and current 112 is received from the set of biologically active organic matter 104 and the power generation circuit 108 transforms the first voltage and current 112 into a second voltage and current 114.

The set of electrodes 106 are configured to be coupled to the set of biologically active organic matter 104.

The set of electrodes 106 is some examples are configured as a pin grid. The pin grid in some examples includes a center copper electrode surrounded by a plurality of galvanically coupled zinc electrodes 106, while in other examples includes two carbon poles. When optimizing the pin grid's length, form, area and depth into the organic matter 104 can be varied so as to increase a generated voltage and/or current output current (e.g. a flashing LED becomes a continuous lighted LED).

The organic matter 104 in various examples includes at least one of: bacteria, algae, fungi, fruit, an apple, a grape, rice, dirt, tree, plant, agricultural product, corn, spinach, an indoor plant, etc.

For example, the organic matter 104 can be a single piece of fruit, or soil proximate to a living plant. Thus in one example, acid in a fruit provides transport for charge carriers between a center copper electrode and a set of galvanically connected surrounding zinc electrodes 106. These copper and zinc electrodes 106 may degrade over time because they are part of the energy harvesting process. In another example, energy can be harvested from bacteria and sugar of a living water-based plant using two carbon electrodes 106. Since carbon electrodes 106 in this example are not part of the energy process they will not degrade over time, thereby providing a constant power source as long as the plant lives and have water.

The power generation circuit 108 is coupled to the electrodes 106. The power generation circuit 108 is configured to receive a first voltage and current 112 from the organic matter 104, and output a second voltage and current 114 generated by the first voltage and current 112.

The power generation circuit 108 in some examples includes a voltage boost circuit configured to transform the first voltage and current 112 into the second voltage and current 114. The boost circuit enables a maximum value of the second voltage and current 114 to be greater than a maximum value of the first voltage and current 112.

The monitoring circuit 110 coupled to the electrodes 106 and coupled to monitor the first voltage and current 112, and to be powered by the second voltage and current 114. The monitoring circuit 110 translates variations in the first voltage and current 112 into an environmental attribute.

The environmental attribute in some example embodiments is an attribute of the organic matter 104 itself, and can include internal condition and/or attributes of the organic matter 104 including: equivalent sugar production, bacterial damage, PH level, fructose level, photosynthesis, oxygen production, structural firmness, decay, insect damage, and chemistry.

The environmental attribute in some example embodiments is an attribute of an environment surrounding the organic matter 104. In some examples the organic matter can act as a proxy for the surrounding environment, and in other examples the organic matter powered device 102 supplies power to other sensors (e.g. temperature, humidity, etc.) for monitoring the surrounding environment.

The surrounding environment in various example applications includes at least one of: an agricultural field, a rice patty, a grain field, a legume field, a forest, an orchard, a vineyard, an aquatic environment, or an interior office environment. In some example applications, measurements can be taken periodically for perhaps 5 to 10 years. Even conditions when the host (e.g. from which energy was harvested) dies, the last collected data can also be stored in non-volatile memory.

The surrounding environment attribute can include: temperature, PH level, humidity, radiation level, smog level, carbon dioxide level, ambient light level, length of daylight time, and light color (i.e. wavelengths).

In some example embodiments, various different types of organic matter can be interspersed where the organic matter powered device 102 obtains energy from a first set of relatively less expensive organic matter (e.g. dirt in ground), but the monitoring circuit 110 is configured to provide information on a wholly different type of organic matter (e.g. more expensive plants, such as vineyard grapes).

Figure 2B:
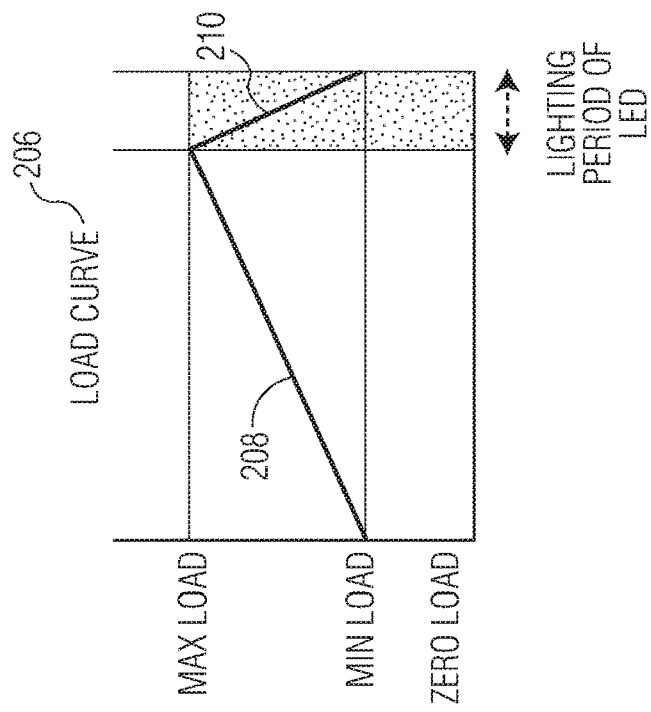
FIG. 2B is an example load curve of the voltage boost circuit.
Figure 2A:
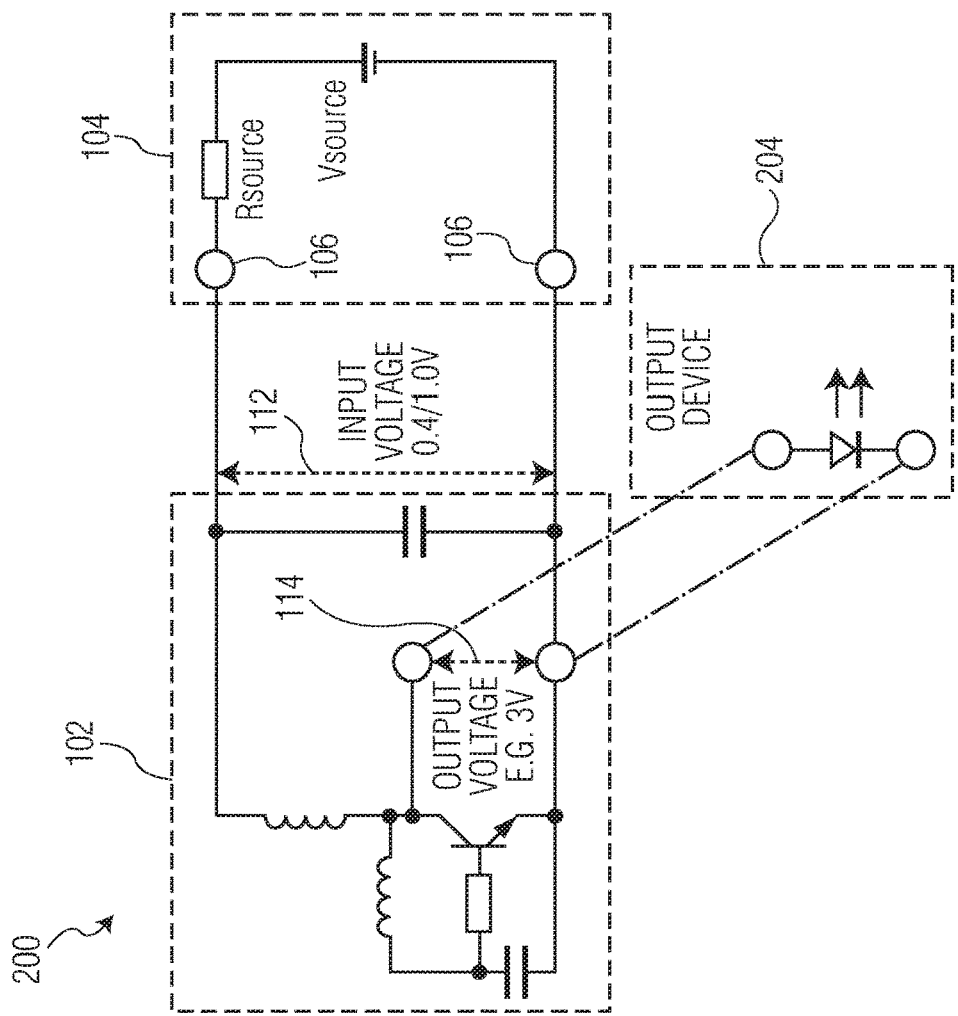
FIG. 2A is an example voltage boost circuit within the organic matter powered device.

FIG. 2A is an example 200 voltage boost circuit within the organic matter 104 powered device 102. FIG. 2B is an example load curve 206 of the voltage boost circuit in this example organic matter powered device 102.

The example 200 includes an output device 320 and FIG. 2B shows the load curve 206, having a charging portion 208 and a discharging portion 210

The very low voltages provide by certain organic matter 104 used for a power source in some example embodiments could be in a range of between 0.4 and 0.9 V and up to of 1 mA (e.g. a living plant power source may generate 0.66 V at 0.5 mA). As the water becomes less the voltage drops down till 0.4 V.

The example 200 voltage boost converter is shown in FIG. 2A can work with a very low DC input voltage down to 0.4 V and boost the voltage till somewhere between 3.0 and 3.5 V. This example 200 boost converter circuit works with transistors that need at least a 0.62 or 0.7 V starting voltage for proper operation.

The voltage boost circuit in some examples includes a voltage stabilizer able to adjust to a wide operating temperature range. Example inductors and/or electrolytic capacitors may also be included as shown. In some example embodiments, the voltage boost logic is integrated in an IC, perhaps using MOSFETs with very low on-state gate-threshold voltages, or including a capacitive converter. Such an IC implementation can reduce starting voltages to 0.40 V.

In other example embodiments, a constant voltage source (e.g. 3.3 V at 0.5 mA) can be created by adding a super capacitor of 0.1 F across the second voltage and current 114. Such a design can be suitable for sending short wireless messages about once a minute, consuming 30 mA for each transmission.

Figure 3:
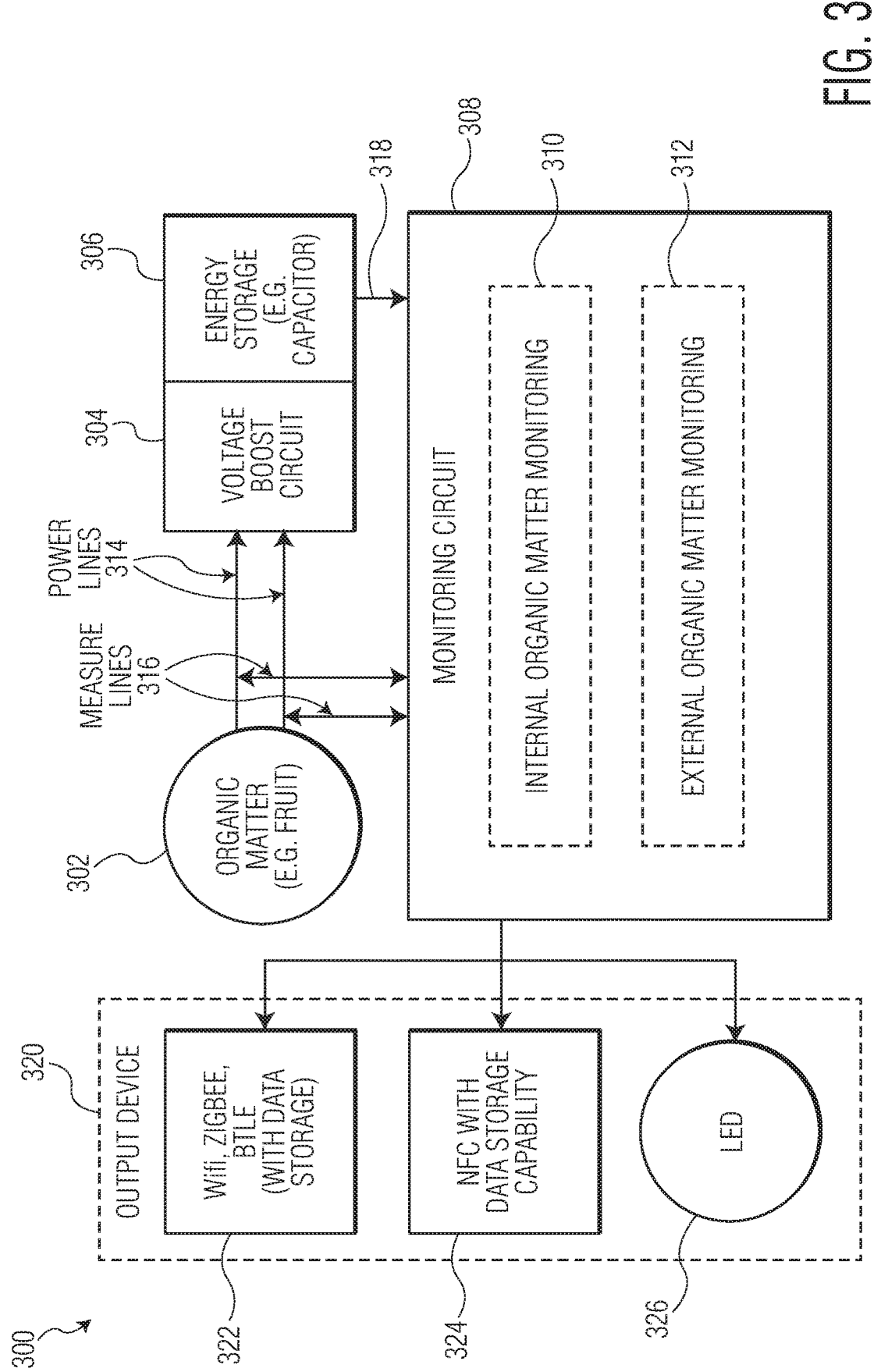
FIG. 3 is a second example of the organic matter powered device.

FIG. 3 is a second example of the organic matter powered device 102. The example 300 includes a set of biologically active organic matter 302, a voltage boost circuit 304, an energy storage 306, a monitoring circuit 308, input power lines 314, measure lines 316, output power line 318, and a set of output devices 320 that can include data storage.

The monitoring circuit 308 includes an internal organic matter monitoring circuit 310 and an external organic matter monitoring circuit 312. The internal organic matter monitoring circuit 310 in some examples is configured to periodically measure the organic matter 302 equivalent sugar production, bacterial damage, PH level, fructose level, photosynthesis, oxygen production, structural firmness, decay, insect damage, and chemistry. The external organic matter monitoring circuit 312 in some examples is configured to periodically measure the organic matter's 302 surrounding environmental temperature, equivalent sugar production, bacterial damage, PH level, fructose level, iron uptake,- photosynthesis, oxygen production, structural firmness, decay, insect damage, chemistry and/or other attributes.

The input power lines 314 and measure lines 316 are coupled to receive the first voltage and current 112 of the organic matter powered device 102. The output power line 318 are coupled to output the second voltage and current 114.

The output devices 320 include communications devices such as far-field, Zigbee, BTLE (Bluetooth Low Energy), and even the more power consuming WiFi 322 (all with data storage), near-field NFC 324 (with data storage), and radiation generating devices such as an LED 326 (no storage device needed).

Other devices such as an acoustic generation device (e.g. sound, perhaps to scare predators away), or direct temperature, humidity, daylight sensors are also possible.

When an output device 320 is a communications transponder configured to generate a communications signal, then the output device 320 can be coupled to receive the environmental attribute from the monitoring circuit 308 and modulate the environmental attribute on to the communications signal.

When an output device 320 is configured as a radiation source, the radiation source and either be configured as a long-distance communications tool (e.g. flashing or continuous visible LED) or in a feedback configuration.

An example feedback configuration includes when the set of electrodes 106 are configured to be coupled to a first set of biologically active organic matter, but the radiation source is configured to promote health or growth of a second set of biologically active organic matter. The second set of biologically active organic matter 104 in some example applications may not be galvanically coupled to the set of electrodes 106 and/or the first set of biologically active organic matter.

For example, the radiation source can be an ultra-violet (UV) radiation source or an infra-red (IR) radiation source that is powered by the first set of organic matter but promotes the health and/or growth of only the second set of organic matter.

In some examples, the first set of organic matter does not depend upon sunlight for growth and/or health, and the second set of organic matter does depend upon sunlight for growth and/or health.

In one example application, oranges, that need UV light, can be grown underground using power from chicory and/or mushrooms, that do not need UV light.

Thus in otherwise harsh/unfavorable growing (e.g. little or no sunlight) conditions, the first set of organic matter can support growth of the second set of organic matter (e.g. one less-expensive or easier to grow type of sacrificial plant could be interspersed with a very expensive and/or hard to grow type of plant, flower, grape, etc.).

The first and second sets of organic matter can be in an enclosure (not shown) that substantially blocks radiated energy from an ambient environment. Such an enclosure could be a warehouse, a nursery, a hydroponic nursery, a Aeroponics nursery, an underwater nursery, a cave, or a space environment.

Figure 4:
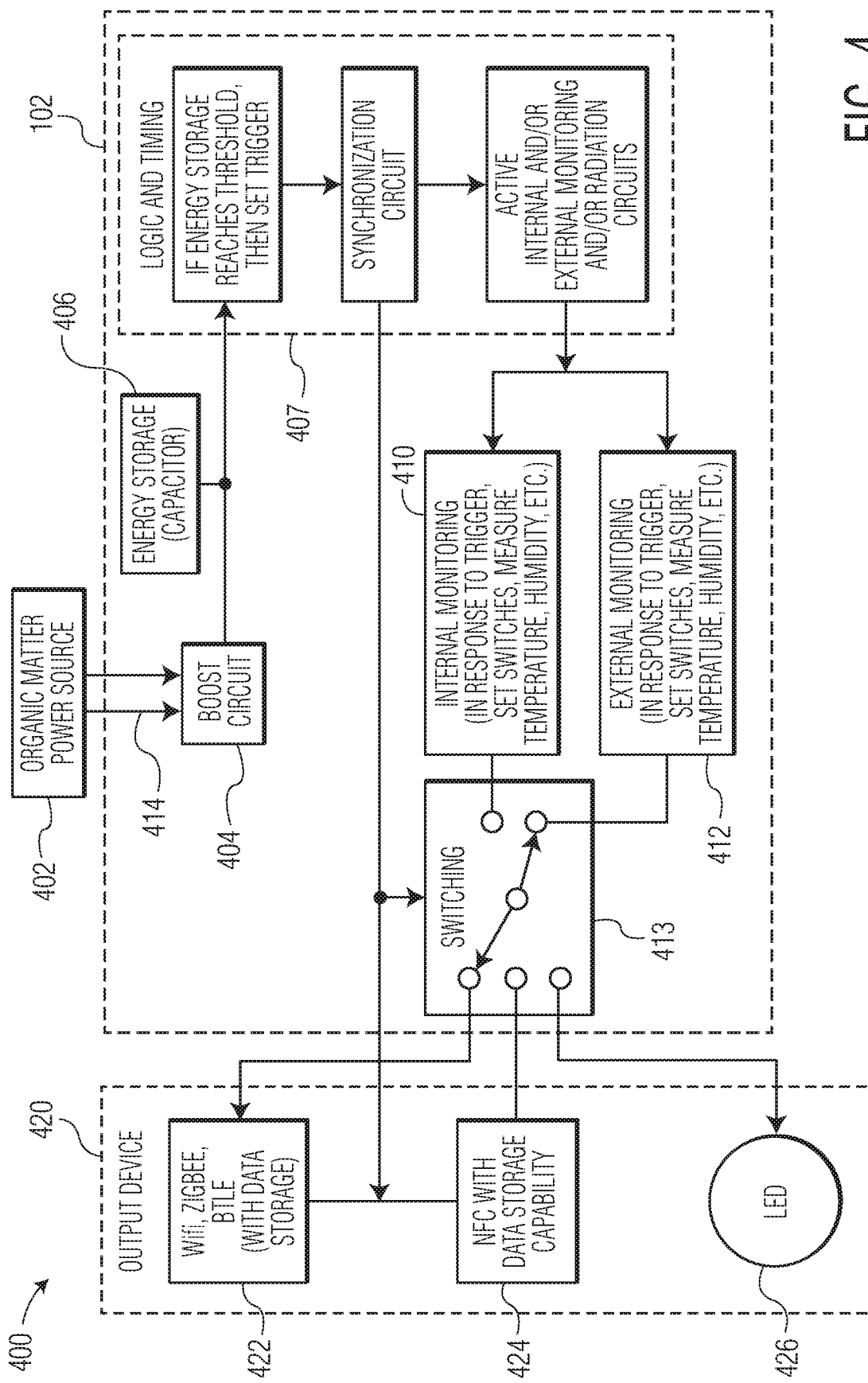
FIG. 4 is a fourth example of the organic matter powered device.

FIG. 4 is a third example of the organic matter powered device 102. The example 400 of the organic matter powered device 102 includes a set of biologically active organic matter 402, a voltage boost circuit 404, energy storage 406, a logic and timing circuit 407, an internal organic matter monitoring circuit 410, an external organic matter monitoring circuit 412, a switching circuit 413, input power lines 414, and a set of output devices 420 (e.g. Zigbee, BTLE, and even the more power consuming WiFi 422 (all with data storage), LED 426 (no storage device needed).

In the particular example switch 413 configuration shown in FIG. 4, the external monitoring/measurement 412 has been selected and the external surrounding environment attribute will be transmitted with one or more of the output devices 420, depending on which output devices 420 have been selected. For this example a Zigbee element has been selected.

Figure 5:
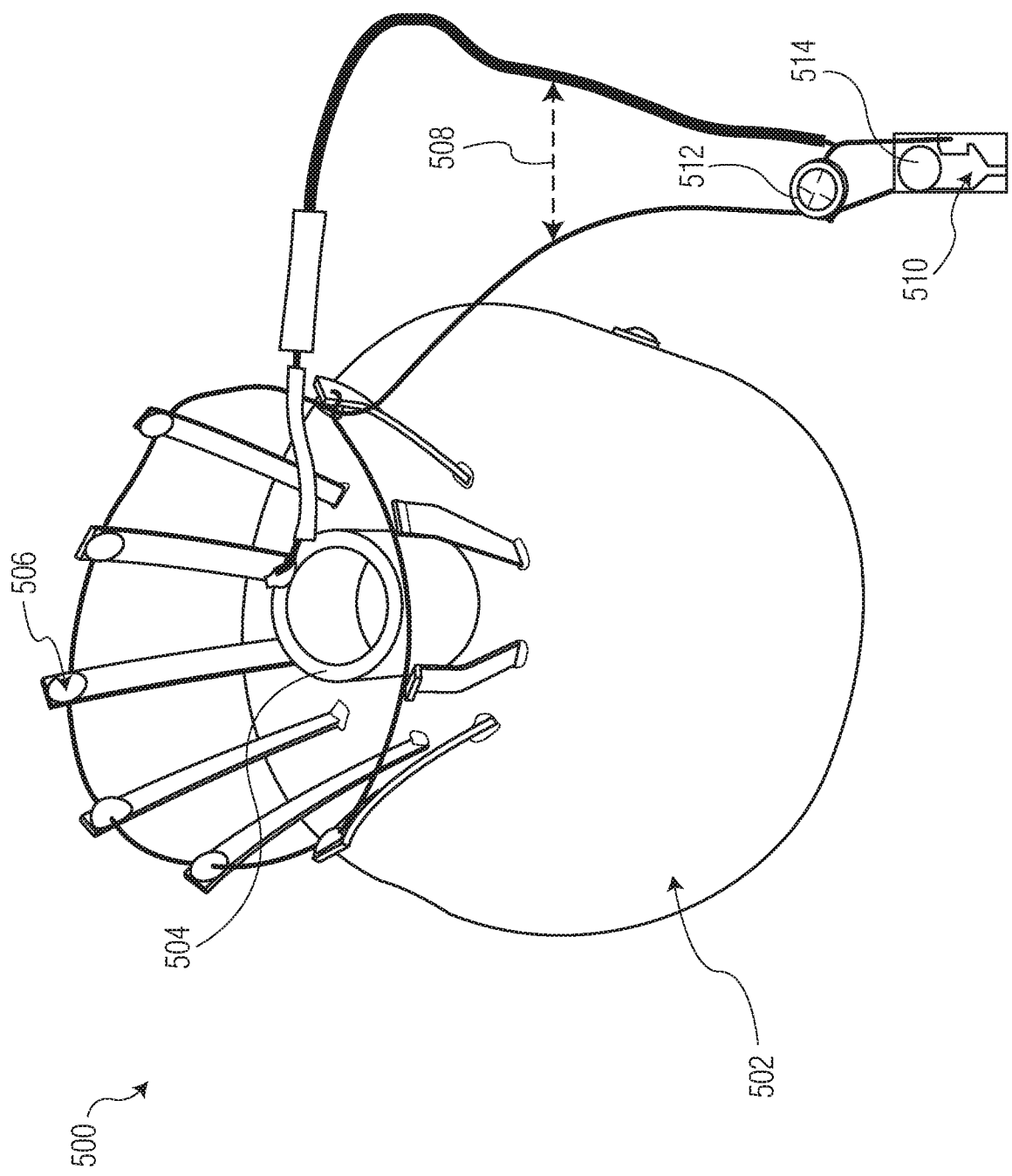
FIG. 5 is a fifth example of the organic matter powered device.

FIG. 5 is a fourth example 500 of the organic matter powered device 102. The example 500 of the organic matter powered device 102 is coupled to a set of biologically active organic matter 502. The organic matter powered device 102 includes a center copper positive electrode 504, a pin grid set of galvanically coupled zinc pins forming a negative electrode 506, a voltage boost circuit 510, an energy storage 512, and an output device 514. The organic matter 502 generates a first voltage and current 508. In this example the output device 514 is a white LED.

Representative first voltage and current 508 levels from this example 500 embodiment are: 1.0 V and 0.9 mA (0.1 mA per Zinc pin). The voltage boost circuit 510 and energy storage 512 can generate 3.0 V at 0.5 mA. The energy storage 512 (e.g. electrolytic capacitor) can accumulate and supply energy to be able to make enough current of 2.5 mA to start the voltage booster. When the white LED is on, the voltage decreases form 1.0 V till 0.58 V, the booster will switch off. Than the process starts again so you will get a flashing LED with a flash-time of approx. 0.5 sec on and 0.5 sec off. For a constant "on" LED operation, the number of Zinc pins can be increased to twenty.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, data storage (memory), application specific chips, firmware, as well as other hardware forms.

When the instructions are embodied as a set of executable instructions in a non-transient computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transient machine or computer-usable media or mediums as defined herein excludes signals, but such media or mediums may be capable of receiving and processing information from signals and/or other transient mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. An organic matter powered device, comprising:
    a set of electrodes configured to be coupled to a set of biologically active organic matter;
    a power generation circuit coupled to the electrodes;
    wherein the power generation circuit is configured to receive a first voltage and current from the organic matter, and output a second voltage and current generated by the first voltage and current;
    a monitoring circuit coupled to the electrodes and coupled to monitor the first voltage and current, and to be powered by the second voltage and current;
    wherein the monitoring circuit is configured to use calculation to translate variations in the first voltage and current into an environmental attribute; and
    wherein the monitoring circuit is configured to output the environmental attribute to a set of other devices.

2. The device of claim 1:
    wherein the environmental attribute is an attribute of the organic matter itself.

3. The device of claim 2:
    wherein the environmental attribute includes at least one of the organic matter's: equivalent sugar production, bacterial damage, PH level, fructose level, photosynthesis, oxygen production, structural firmness, decay, insect damage, and chemistry.

4. The device of claim 1:
    wherein the organic matter is coupled to a surrounding environment; and
    wherein the environmental attribute is an attribute of the surrounding environment.

5. The device of claim 4:
    wherein the surrounding environment includes at least one of: an agricultural field, a rice patty, a grain field, a legume field, a forest, an orchard, a vineyard, an aquatic environment, or an interior office environment.

6. The device of claim 4:
    wherein the surrounding environment attribute is at least one of: temperature, PH level, humidity, radiation level, smog level, carbon dioxide level, ambient light level, length of daylight time, or light color.

7. The device of claim 1:
    wherein the organic matter includes at least one of: bacteria, algae, fungi, fruit, an apple, a grape, rice, dirt, tree, plant, agricultural product, corn, spinach, or an indoor plant.

8. The device of claim 1:
    wherein the organic matter is a single piece of fruit.

9. The device of claim 1:
    wherein the organic matter is soil proximate to a living plant.

10. The device of claim 1:
    wherein the power generation circuit includes a voltage boost circuit configured to transform the first voltage and current into the second voltage and current.

11. The device of claim 1:
    wherein the set of electrodes are configured as a pin grid.

12. The device of claim 11:
    wherein the pin grid includes a center electrode surrounded by a plurality of galvanically coupled electrodes.

13. The device of claim 1:

further comprising an output device configured to generate a communications signal;

wherein the output device is coupled to receive the environmental attribute from the monitoring circuit and modulate the environmental attribute on to the communications signal.

14. The device of claim 1:

further comprising an output device configured as a radiation source;

wherein the output device is coupled to receive power from the power generation circuit.

15. The device of claim 14:

wherein the radiation source includes at least one of: an LED (Light Emitting Diode) or an acoustic generation device.

16. The device of claim 14:

wherein the set of electrodes are configured to be coupled to a first set of biologically active organic matter;

wherein the radiation source is configured to promote health or growth of a second set of biologically active organic matter; and wherein the second set of biologically active organic matter is not coupled to the set of electrodes.

17. The device of claim 16:

wherein the radiation source is an ultra-violet (UV) radiation source.

18. The device of claim 16:

wherein the radiation source is an infra-red (IR) radiation source.

19. The device of claim 16:

wherein the first set of biologically active organic matter does not depend upon sunlight for growth and/or health, and the second set of biologically active organic matter does depend upon sunlight for growth and/or health.

20. The device of claim 16:

wherein the first set of biologically active organic matter is a chicory.

21. The device of claim 16:

wherein the first set of biologically active organic matter is a mushroom.

22. The device of claim 1:

wherein at least one of the other devices is configured to receive the environmental attribute from the monitoring circuit and modulate the environmental attribute; and wherein the monitoring circuit is configured to confirm that such modulation occurred.

* * * * *